US010862844B2

(12) United States Patent
Singh et al.

(10) Patent No.: US 10,862,844 B2
(45) Date of Patent: Dec. 8, 2020

(54) MERGED MESSAGE STORAGE DATA STRUCTURE

(71) Applicant: Microsoft Technology Licensing, LLC, Redmond, WA (US)

(72) Inventors: Surendra Singh, Bothell, WA (US); Harsh, Bellevue, WA (US); Xiaozhong Pan, Redmond, WA (US); Joshua Lan, Seattle, WA (US); Narasimhan Govindarajan, Redmond, WA (US); Jayanth Munikote Rajeevalochanam, Redmond, WA (US); Prashanth Venkataraman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/351,395

(22) Filed: Mar. 12, 2019

(65) Prior Publication Data
US 2020/0296065 A1 Sep. 17, 2020

(51) Int. Cl.
*H04L 12/58* (2006.01)

(52) U.S. Cl.
CPC ............. *H04L 51/22* (2013.01); *H04L 51/14* (2013.01); *H04L 51/16* (2013.01); *H04L 51/18* (2013.01); *H04L 51/28* (2013.01); *H04L 51/30* (2013.01)

(58) Field of Classification Search
CPC ......... H04L 51/22; H04L 51/14; H04L 51/16; H04L 51/18; H04L 51/28; H04L 51/30
See application file for complete search history.

(56) References Cited

U.S. PATENT DOCUMENTS

| 7,685,237 | B1* | 3/2010 | Weaver ................. G06Q 10/10 709/205 |
| 2005/0220064 | A1 | 10/2005 | Hundscheidt et al. |
| 2009/0168759 | A1* | 7/2009 | Katis .................. H04L 65/1083 370/352 |
| 2011/0256907 | A1* | 10/2011 | Lee ................... H04M 1/27475 455/566 |
| 2013/0110953 | A1 | 5/2013 | Sutedja et al. |

(Continued)

OTHER PUBLICATIONS

"International Search Report & Written Opinion issued in PCT Application No. PCT/US20/021052", dated May 27, 2020, 13 pages.

*Primary Examiner* — Kristie D Shingles
(74) *Attorney, Agent, or Firm* — Alleman Hall Creasman & Tuttle LLP

(57) ABSTRACT

A data processing system, including non-volatile memory storing a plurality of messages included in a group discussion among a plurality of users. The non-volatile memory may further store metadata including an ordering of the messages. The data processing system may further include a processor configured to, for a first message storage data structure and a second message storage data structure, each associated with a first user of the plurality of users, determine that the one or more messages of the first message storage data structure and the second message storage data structure are contiguous in the ordering. The processor may generate a merged message storage data structure including each message included in the first message storage data structure and the second message storage data structure. The processor may generate a receipt based on the merged message storage data structure and transmit the receipt to a second user.

20 Claims, 11 Drawing Sheets

(56) References Cited

U.S. PATENT DOCUMENTS

2014/0032692 A1   1/2014  Klassen
2018/0302352 A1*  10/2018 Chen .................. G06F 3/04883
2019/0098087 A1*  3/2019  Johnston ............. G06Q 10/107

* cited by examiner ns. FIG. 4 shows the server computing device of FIG. 1 in an embodiment in which the processor is configured to generate an accessed-by-all indication.

MERGED MESSAGE STORAGE DATA STRUCTURE

BACKGROUND

Messaging application programs provide a convenient way for users to send messages back and forth electronically between groups of two or more users. Such messaging application programs typically send messages over communications networks such as the public switched telephone networks (PSTN) and/or computer networks such as the Internet via instant messaging protocols such as Short Messaging Service (SMS), Multimedia Messaging Service (MMS), Windows Messaging Protocol (WMP), etc. The messages are typically sent from a sender device to one or more recipient devices via a platform messaging service operating on a computer server. Challenges exist for efficient ways identify to the sender and various recipients which of the parties has read the various messages that have been exchanged, as discussed in detail below.

SUMMARY

According to one aspect of the present disclosure, a data processing system is provided, including non-volatile memory storing a plurality of messages included in a group discussion among a plurality of users. The non-volatile memory may further store metadata associated with the plurality of messages. The metadata may include an ordering of the plurality of messages. The data processing system may further include a processor configured to, for a first message storage data structure and a second message storage data structure, each associated with a user of the plurality of users and each including one or more messages, determine that the one or more messages of the first message storage data structure and the one or more messages of the second message storage data structure are contiguous in the ordering of the plurality of messages. The processor may be further configured to generate a merged message storage data structure including each message included in the first message storage data structure and the second message storage data structure. The processor may be further configured to generate a receipt based on the merged message storage data structure and transmit the receipt to another user of the plurality of users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

When using messaging application programs, it is frequently useful for users to know whether their messages have been delivered to other users and whether those other users have viewed the messages. Thus, many existing messaging applications include delivery receipts and read receipts. Delivery receipts and read receipts are indications output to users of a messaging system that one or more other users have received or viewed a message. The inventors have recognized that storing delivery receipts and read receipts on a server may require large amounts of memory to be used, especially when a delivery receipt and/or a read receipt is stored for each message.

Delivery receipts and read receipts may be instead stored on client devices. However, the inventors have recognized a drawback with this approach, which is that a user who views a conversation on more than one device is typically unable to view read receipts and delivery receipts for messages that user has sent from other devices.

In addition, a "last read" marker may be provided instead of read receipts for individual messages. However, the inventors have recognized that while the "last read" marker occupies less storage space than read receipts provided for individual messages, it also omits some of the information a read receipt would convey. For example, if a user has read the most recent message but not another message that is not the most recent, the "last read" marker would not indicate that the user has not read the earlier message.

Figure 1:
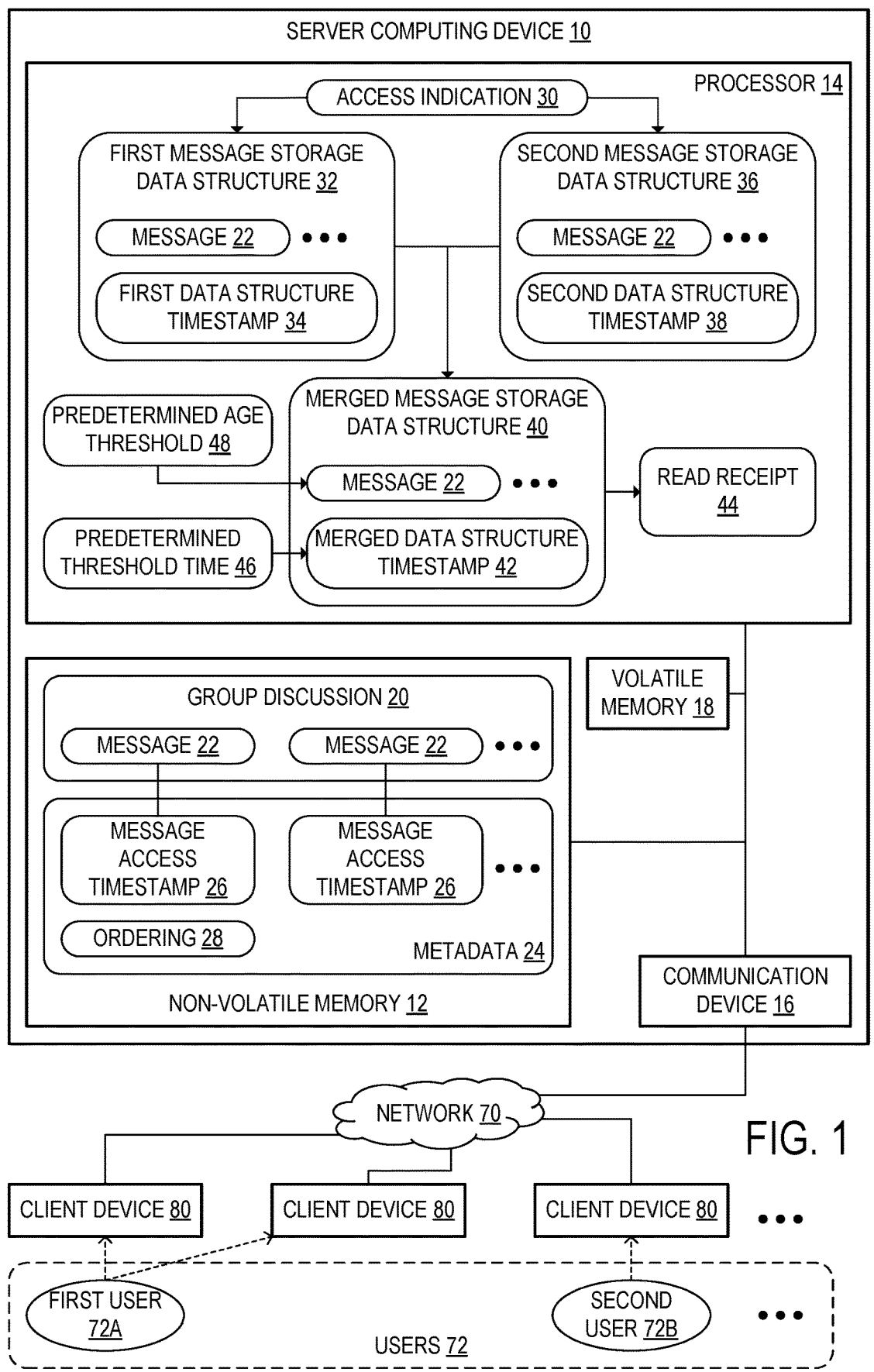
FIG. 1 shows a data processing system in the form of a server computing device configured to generate a read receipt, according to one embodiment of the present disclosure.

In order to address these issues, the inventors have conceived of the following systems and methods. FIG. 1 shows a data processing system in the form of an example server computing device 10, according to one embodiment of the present disclosure. The server computing device 10 may include non-volatile memory 12, a processor 14, one or more communication devices 16, volatile memory 18, and/or other hardware components. Although the server computing device 10 is shown as a single hardware device in the example of FIG. 1, the functions of the server computing device 10 and its components may be distributed across a plurality of separate computing devices that communicate via their respective communication devices 16. The server computing device 10 may be further configured to communicate with one or more client devices 80 using the one or more communication devices 16. Communication with the one or more client devices 80 may occur over a network 70.

The non-volatile memory 12 may store a plurality of messages 22 included in a group discussion 20 among a plurality of users 72. The messages 22 may each include one or more of text, images, audio, video, and/or other output modalities. The plurality of users 72 may, in some embodiments, each participate in the group discussion 20 via a separate client device 80. Alternatively, two or more users 72 may share a client device 80, and/or at least one user 72 may participate in the group discussion 20 via a plurality of client devices 80. In some embodiments, each user 72 may have a user account. In such embodiments, the user 72 may access the group discussion 20 by logging into the user account on the client device 80. Thus, by logging into the user account on two or more client devices 80, the user 72 may access the group discussion 20 on more than one client device 80 but still be recognized as the same user 72 by the server computing device 10.

The non-volatile memory 12 may further store metadata 24 associated with the plurality of messages 22. The metadata 24 may include an ordering 28 of the plurality of messages 22. The ordering 28 may be a temporal ordering that indicates an order in time in which the plurality of messages 22 were received by the server computing device 10 or sent by the one or more client devices 80. In some embodiments, the ordering 28 may be determined based on a plurality of server-side timestamps indicating the respective times at which the plurality of messages 22 were received at the server computing device 10.

The non-volatile memory 12 may further store a first message storage data structure 32 and a second message storage data structure 36 that are both associated with a first user 72A of the plurality of users 72. The first message storage data structure 32 and the second message storage data structure 36 may each respectively include one or more messages 22 of the plurality of messages 22 included in the group discussion 20.

The first message storage data structure 32 and the second message storage data structure 36 may each indicate that the first user 72A has accessed the one or more messages 22 respectively included in that data structure. When the first user 72A accesses one or more messages 22, the client device 80 at which the user 72A accesses the one or more messages 22 may transmit an access indication 30 to the server computing device 10. In response to receiving the access indication 30, the processor 14 may add the one or more messages 22 and/or metadata 24 associated with the one or more messages 22 to the first message storage data structure 32 or the second message storage data structure 36. In some embodiments, the processor 14 may generate a new message storage data structure whenever an access indication 30 is received. The new message storage data structure may, in such embodiments, be subsequently combined with another message storage data structure, as discussed below.

In one example, the one or more messages 22 included in the first message storage data structure 32 may be one or more messages 22 displayed on a screen of a client device 80 at a first time, and the one or more messages 22 included in the second message storage data structure 36 may be one or more messages 22 displayed on a screen of a client device 80 at a second time. Thus, in such embodiments, the first message storage data structure 32 and the second message storage data structure 36 may each indicate a respective subset of the plurality of messages 22 in the group discussion 20 that have been viewed by the first user 72A. In another example, the first message storage data structure 32 and the second message storage data structure 36 may each include one or more audio messages output by one or more speakers of a client device 80 during a first time interval and a second time interval respectively. In general, the first message storage data structure 32 and the second message storage data structure 36 may each indicate that the user 72A has accessed the one or more messages 22 they include via any output modality of the client device 80.

In some embodiments, the first message storage data structure 32 and the second message storage data structure 36 may include indications of one or more messages 22 having been accessed by the first user 72A on a plurality of client devices 80. For example, when the first user 72A has an account via which the first user 72A logs into the group discussion 20 on two or more client devices 80, the first user 72A may access the one or more messages indicated in the first message storage data structure 32 on a first client device 80 and may access the one or more messages indicated in the second message storage data structure 36 on a second client device 80. In some embodiments, the first message storage data structure 32 and the second message storage data structure 36 may each include an indication of the client device 80 from which the one or more messages 22 included in that data structure were accessed.

The processor 14 may be further configured to determine that the one or more messages 22 of the first message storage data structure 32 and the one or more messages 22 of the second message storage data structure 36 are contiguous in the ordering 28 of the plurality of messages 22. Two sets of messages 22 are contiguous when they are adjacent in the ordering 28 with no intervening messages 22 between them. For example, when the ordering 28 is a temporal ordering, the processor 14 may determine that the one or more messages 22 of the first message storage data structure 32 and the one or more messages 22 of the second message storage data structure 36 are contiguous in the ordering 28 by comparing the respective server-side timestamps of the messages 22. In this example, the processor 14 may determine that the one or more messages 22 of the first message storage data structure 32 and the one or more messages 22 of the second message storage data structure 36 are contiguous when the server-side timestamp of a chronologically last message 22 of the first message storage data structure 32 is immediately followed by a chronologically first message 22 of the second message storage data structure 36.

In response to the determination that the one or more messages 22 of the first message storage data structure 32 and the one or more messages 22 of the second message storage data structure 36 are contiguous in the ordering 28, the processor 14 may be further configured to generate a merged message storage data structure 40. The merged message storage data structure 40 may include each message 22 included in the first message storage data structure 32 and the second message storage data structure 36. Thus, the first message storage data structure 32 and the second message storage data structure 36 may be combined.

In some embodiments, the process of combining a first message storage data structure 32 and a second message storage data structure 36 into a merged message storage data structure 40 may be iterated in order to combine more than two message storage data structures. In such embodiments, the merged message storage data structure 40 resulting from one iteration may be used as the first message storage data structure 32 or the second message storage data structure 36 in a subsequent iteration in which it is combined with another message storage data structure.

After generating the merged message storage data structure 40, the processor 14 may be further configured to generate a receipt based on the merged message storage data structure 40. For example, the receipt may include data included in the merged message storage data structure, such as the merged data structure timestamp 42 and/or one or more messages 22 included in the merged message storage data structure 40. In the embodiment shown in FIG. 1, the receipt is a read receipt 44 indicating that the first user 72A has accessed each message 22 included in the merged message storage data structure 40. The processor 14 may be further configured to transmit the receipt to a second user 72B of the plurality of users 72 using the one or more communication devices 16. The second user 72B may be a user who initially sent a message 22 included in the merged message storage data structure to the server computing device 10 as part of the group discussion 20.

In embodiments in which the receipt is a read receipt 44, the metadata 24 stored in the non-volatile memory 12 may further include a respective message access timestamp 26 for each message 22. The message access timestamp 26 associated with a message 22 may indicate a time at which the first user 72A accessed the message 22. Additionally or alternatively, the message access timestamp 26 may indicate a time at which the server computing device 10 receives the access indication 30.

In some embodiments, the first message storage data structure 32 and/or the second message storage data structure 36 may include a subset of the plurality of messages 22 that are accessed concurrently by the first user 72A. For example, the first user 72A may view a page of notifications on which a plurality of messages 22 are concurrently displayed. In such embodiments, a first data structure timestamp 34 may be associated with the first message storage data structure 32 and a second data structure timestamp 38 may be associated with the second message storage data structure 36. The first data structure timestamp 34 and the second data structure timestamp 38 may be an earliest or latest message 22 in the ordering 28 of the messages 22 included in the respective data structure. Alternatively, the first data structure timestamp 34 and/or the second data structure timestamp 38 may be a mean or median timestamp in the ordering 28. The first data structure timestamp 34 and the second data structure timestamp 38 may each have a compressed data granularity lower than a message data granularity of each message access timestamp 26. For example, the first data structure timestamp 34 and the second data structure timestamp 38 may omit a "seconds" field that is included in the one or more message access timestamps 26 from which is generated.

In other embodiments, the first message storage data structure 32 and/or the second message storage data structure 36 may include a respective message access timestamp 26 for each message 22 without compressing the message access timestamps 26 into a first data structure timestamp 34 and/or a second data structure timestamp 38. In other embodiments, the first message storage data structure 32 and/or the second message storage data structure 36 may include a plurality of message access timestamps 26 but may associate one or more of the message access timestamps 26 with two or more messages 22.

In embodiments in which the metadata 24 includes message access timestamps 26, the receipt may further include a merged data structure timestamp 42 indicating a time at which the first user 72A accessed one or more messages 22 included in the merged message storage data structure 40. For example, the merged data structure timestamp 42 may be an earliest or latest message access timestamp 26 associated with an earliest or latest message 22 in the ordering 28 of the messages 22 included in the merged message storage data structure 40. In embodiments in which the receipt includes a merged data structure timestamp 42, the processor 14 may be configured to generate the merged data structure timestamp 42 at least in part by determining that the first message storage data structure 32 and the second message storage data structure 36 respectively have a first data structure timestamp 34 and a second data structure timestamp 38 within a predetermined threshold time 46 of each other. For example, the processor 14 may be configured to merge the first message storage data structure 32 and the second message storage data structure 36 in response to determining that the first data structure timestamp 34 and the second data structure timestamp 38 are within one minute of each other. In such embodiments, when the first message storage data structure 32 and/or the second message storage data structure 36 includes a plurality of messages 22, the first data structure timestamp 34 and/or the second data structure timestamp 38 may be associated with the data structure as a whole, rather than with individual messages 22 of the plurality of messages 22.

In embodiments in which the processor 14 is configured to generate a merged data structure timestamp 42, the processor 14 may be configured to generate the merged data structure timestamp 42 at least in part by reducing a data granularity of the respective message access timestamps 26 of each message 22 included in the merged message storage data structure 40. For example, the processor 14 may delete data that indicates a minute and a second at which a message 22 included in the merged message storage data structure 40 was accessed by the first user 72A while retaining data that indicates a day and an hour at which the message 22 was accessed. After the merged data structure timestamp 42 is generated, the processor 14 may be further configured to delete the message access timestamp 26 of each message 22 included in the merged message storage data structure 40 from the non-volatile memory 12. Thus, the processor 14 may reduce the amount of non-volatile memory 12 used to store the timestamps used in the read receipt 44. However, the merged data structure timestamp 42 preserves portions of the message access timestamps 26 that may be likely to remain relevant to the users 72 by consolidating the message access timestamps 26 into a lower-granularity form.

Additionally or alternatively, in some embodiments, the processor 14 may be further configured to reduce a respective data granularity of the message access timestamp 26 of each message 22 that is older than a predetermined age threshold 48. Since users 72 are typically less likely to need high levels of data granularity for message access timestamps 26 as those message access timestamps 26 increase in age, the processor 14 may save storage space in the non-volatile memory 12 by reducing the data granularity of each message older than the predetermined age threshold 48 while only erasing data that is unlikely to be used.

Figure 2:
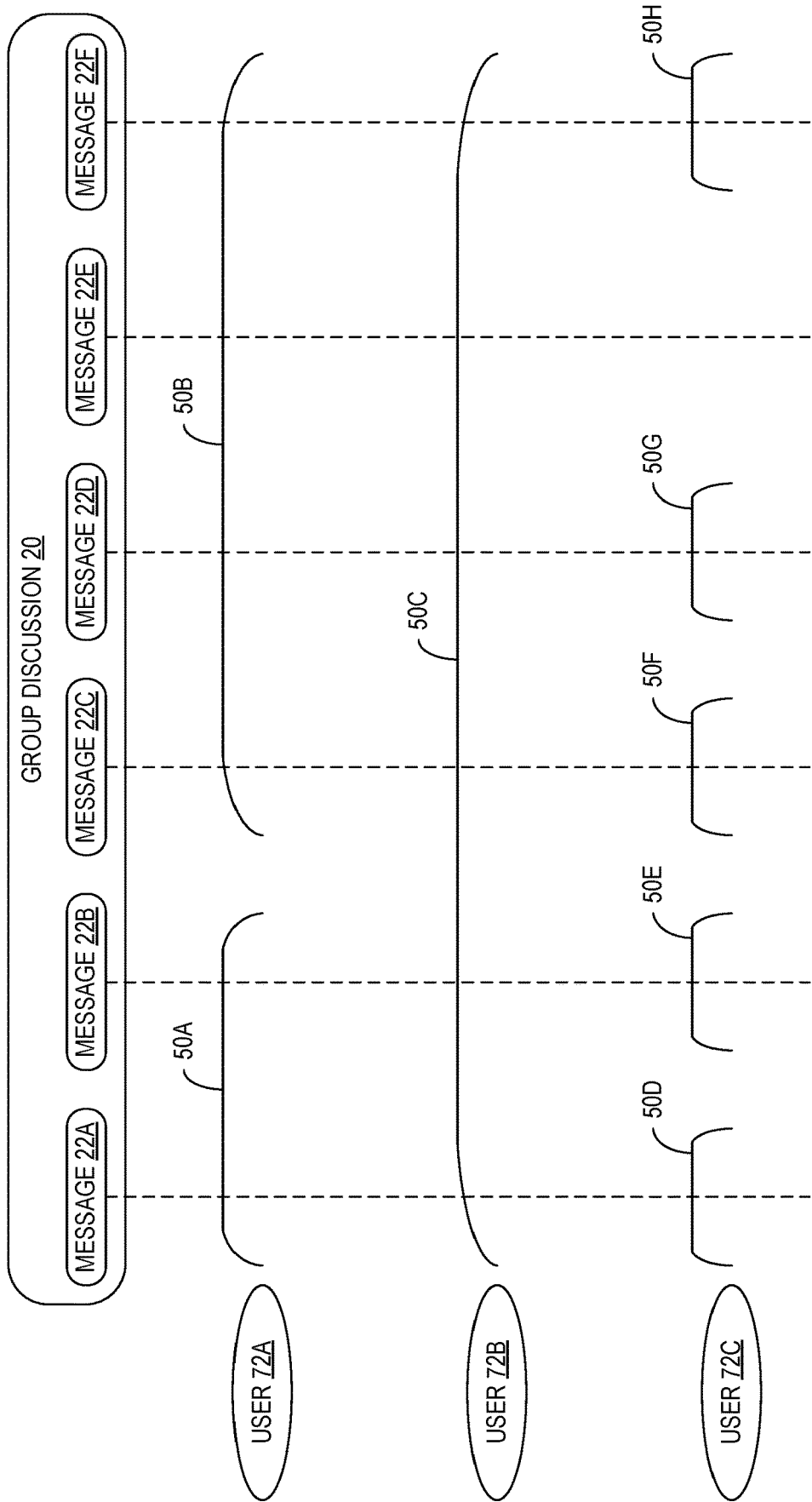
FIG. 2 shows an example group discussion, according to the embodiment of FIG. 1.
Figure 3:
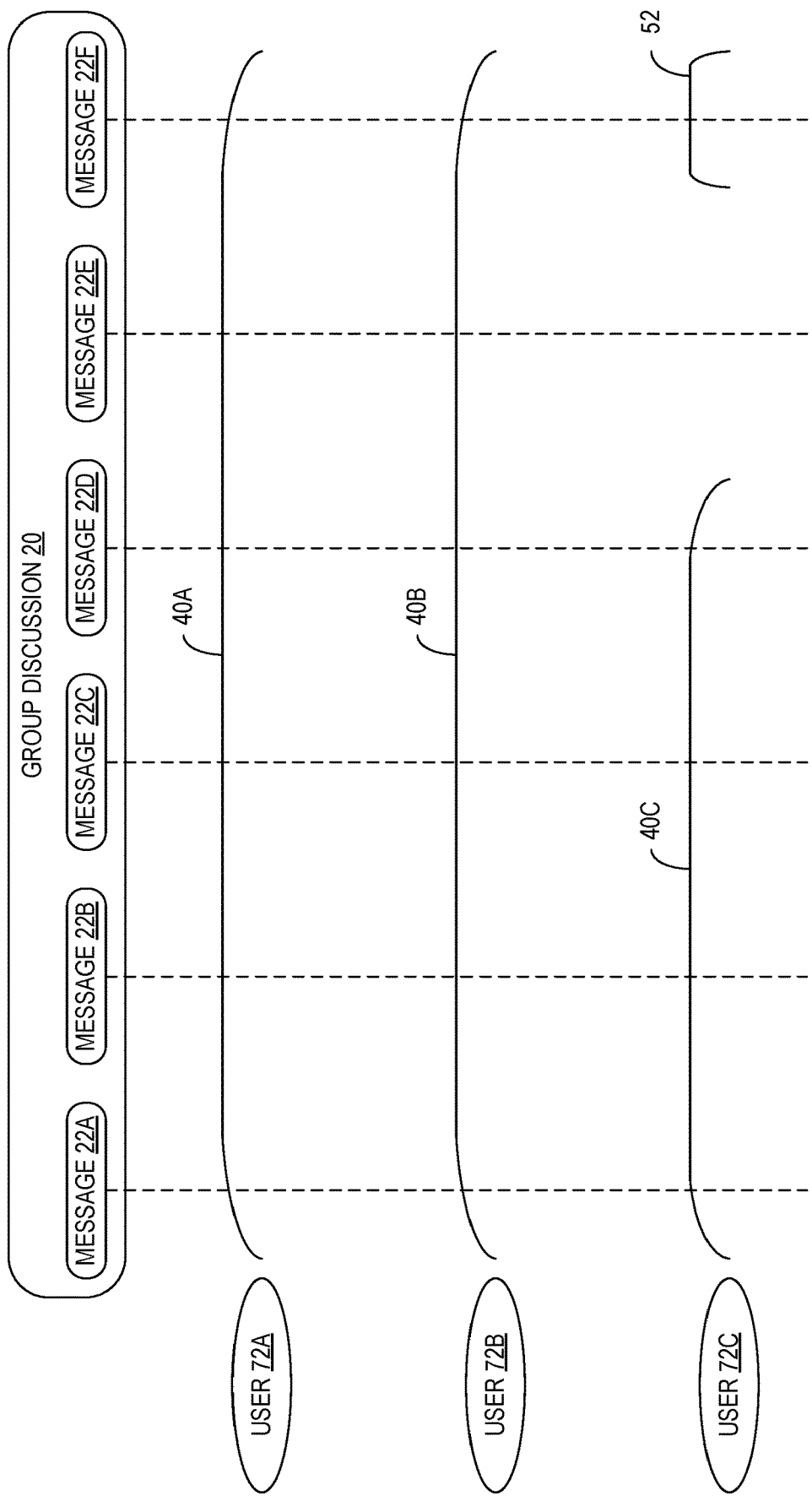
FIG. 3 shows the example group discussion of FIG. 2 when the plurality of messages included in the group discussion are included in merged message storage data structures.

An example of combining the first message storage data structure 32 and the second message storage data structure 36 to form a merged message storage data structure 40 is provided in FIGS. 2 and 3. FIG. 2 shows a first user 72A, a second user 72B, and a third user 72C who participate in a group discussion 20. The group discussion 20 includes a first message 22A, a second message 22B, a third message 22C, a fourth message 22D, a fifth message 22E, and a sixth message 22F. The first user 72A, second user 72B, and third user 72C have accessed the messages 22 according to different schedules. The first user 72A has accessed the first message 22A and the second message 22B during a first session 50A and has accessed the other messages 22 during a second session 50B. The second user 72B has accessed all six messages 22 during a third session 50C. The third user 72C has accessed the first message 22A during a fourth session 50D, the second message 22B during a fifth session 50E, the third message 22C during a sixth session 50F, the fourth message 22D during a seventh session 50G, and the sixth message 22F during an eighth session 50H. The third user 72C has not accessed the fifth message 22E.

Turning now to FIG. 3, the group discussion 20 is shown after the processor 14 has generated a respective merged message storage data structure 40 for each user 72. The first merged message storage data structure 40A generated for the first user 72A and the second merged message storage data structure 40B generated for the second user 72B each include all messages 22 of the group discussion 20, since the first user 72A and the second user 72B have both viewed all the messages 22. For the third user 72C, on the other hand, the processor 14 has generated a third merged message storage data structure 40C including the first message 22A, the second message 22B, the third message 22C, and the fourth message 22D. The processor 14 has further generated a message storage data structure 52 that includes the sixth message 22F and is not a merger of two or more other message storage data structures. Since the third user 72C has not accessed the fifth message 22E, the message storage data structure 52 is not contiguous with the third merged message storage data structure 40C in the ordering 28 and is therefore left separate.

Figure 4:
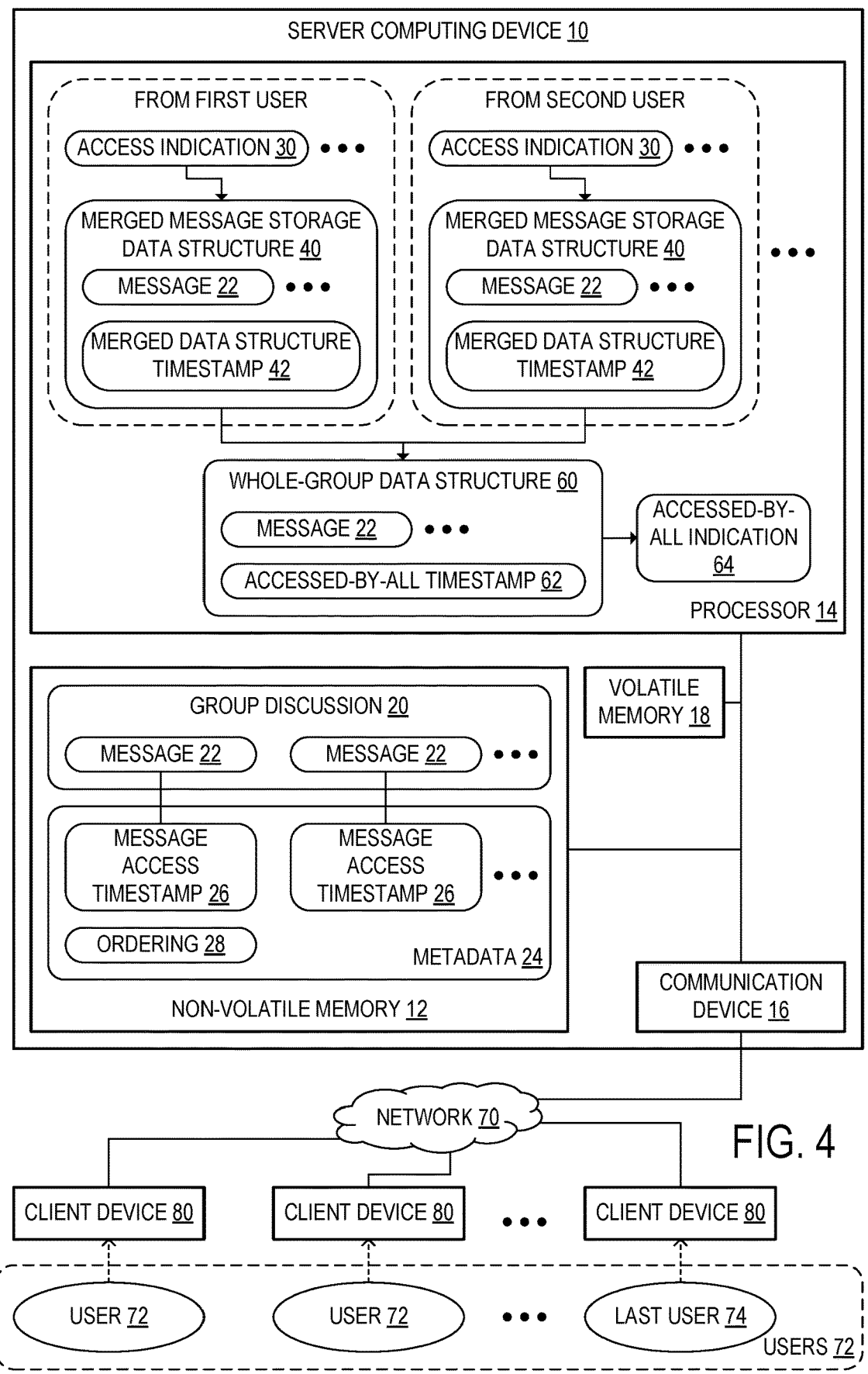
FIG. 4 shows the server computing device of FIG. 1 in an embodiment in which the processor is configured to generate an accessed-by-all indication.

It may be desirable to provide users 72 participating in a group discussion 20 with notifications indicating that all users 72 in the group discussion 20 have accessed a message 22. The server computing device 10 in an embodiment in which such a feature is enabled is shown in FIG. 4. As shown in FIG. 4, the processor 14 may receive a plurality of access indications 30 from each user 72 of the group discussion 20. The processor 14 may be further configured to generate a merged message storage data structure 40 for each user 72 based on the plurality of access indications 30 received from that user 72, as discussed above.

For at least one message 22 of the plurality of messages 22, the processor 14 may be further configured to determine that the message 22 has been accessed by each user 72 of the plurality of users 72. The processor 14 may, for example, be configured to compute an intersection of the respective subsets of the plurality of messages 22 respectively included in the merged message storage data structures 40. The processor 14 may generate a whole-group data structure 60 including each message 22 accessed by all the users 72. The whole-group data structure 60 may further include an accessed-by-all timestamp 62 indicating a time at which a last user 74 of the plurality of users 72 accessed the at least one message 22 included in the whole-group data structure 60.

After determining that the at least one message 22 has been accessed by each user 72, the processor 14 may be further configured to generate an accessed-by-all indication 64 that the message 22 has accessed by each user 72. The processor 14 may be further configured to transmit the accessed-by-all indication 64 to at least one user 72 of the plurality of users 72. In some embodiments, the processor 14 may transmit the accessed-by-all indication 64 to each user 72 included in the group discussion 20. Thus, the server computing device 100 may allow the users 72 included in the group discussion 20 to have common knowledge that each user 72 has accessed one or more messages 22.

Figure 5:
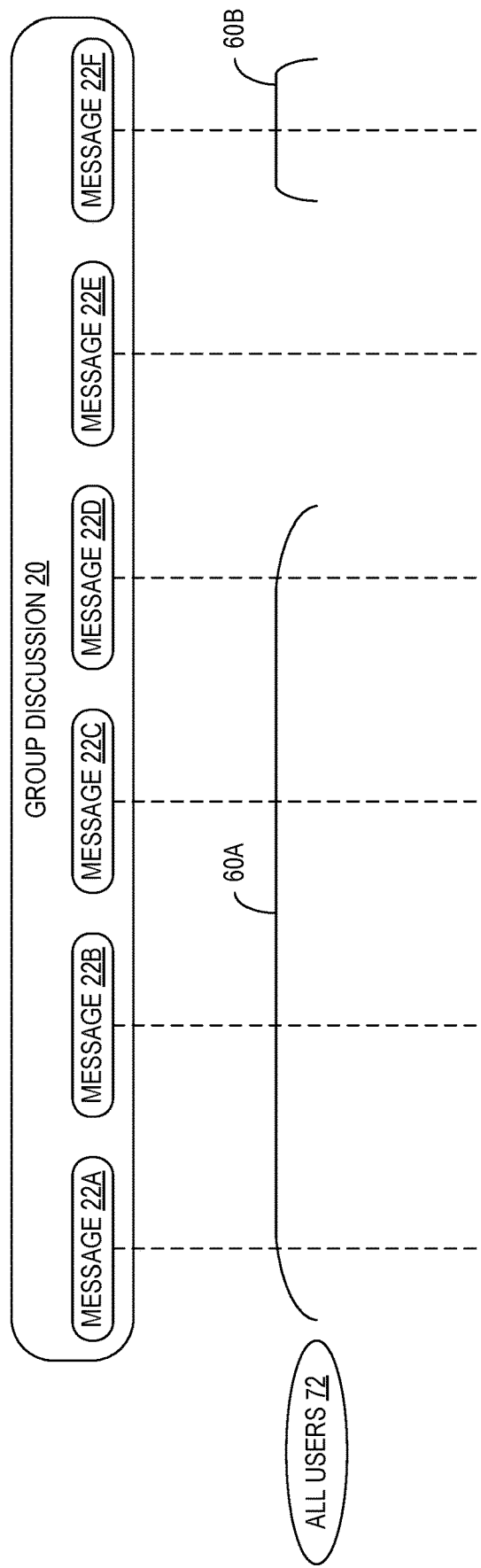
FIG. 5 shows the group discussion of FIG. 2 when a plurality of messages included in the group discussion are included in a whole-group data structure.

FIG. 5 shows the group discussion 20 of FIGS. 2 and 3 in an example in which the processor 14 has generated a first whole-group data structure 60A including the first message 22A, the second message 22B, the third message 22C, and the fourth message 22D. In addition, the processor 14 has further generated a second whole-group data structure 60B including the sixth message 22F. Since the fifth message 22E has not been accessed by the third user 72C, the fifth message 22E is not included in the first whole-group data structure 60A or the second whole-group data structure 60B.

Figure 6:
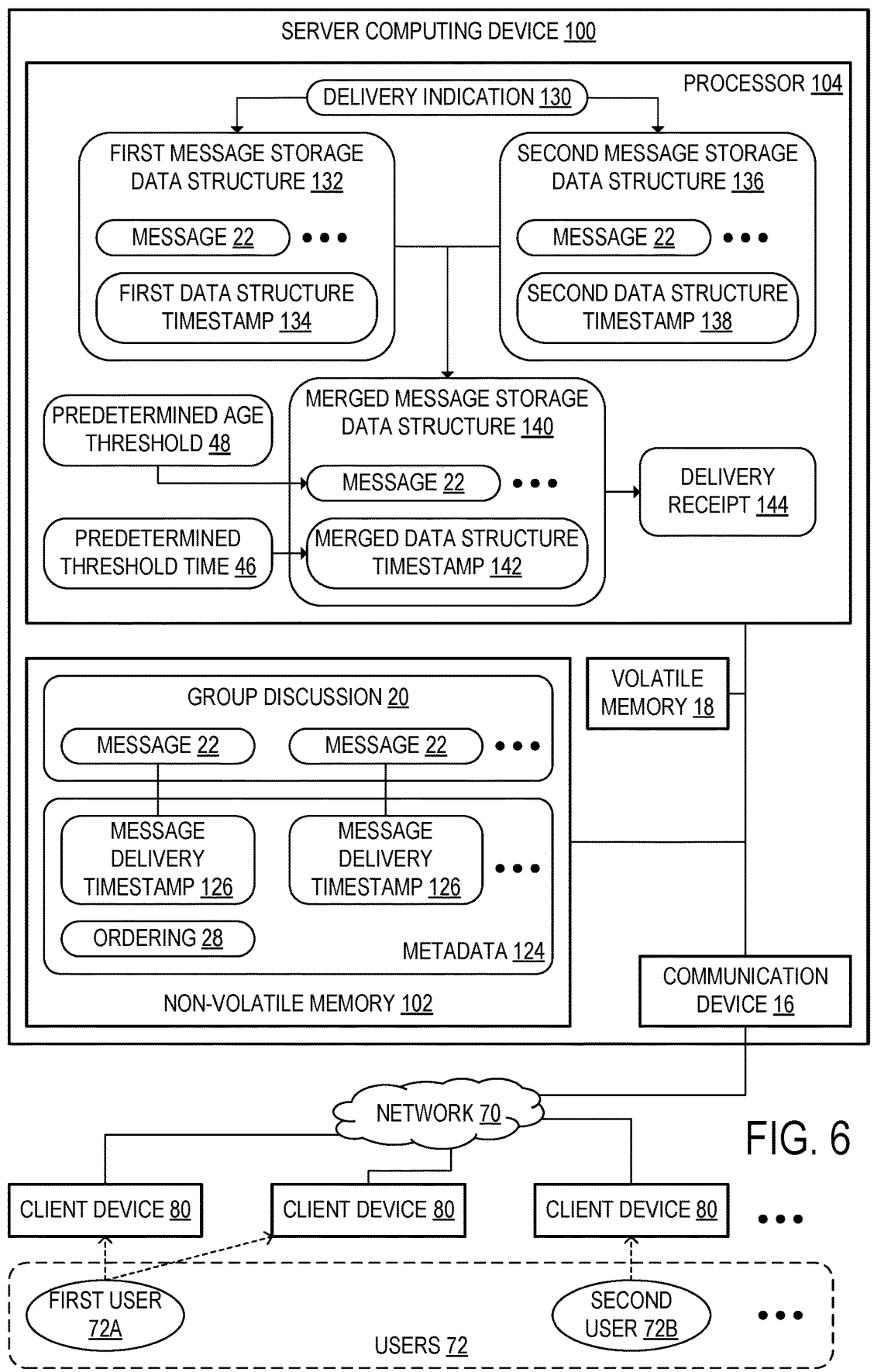
FIG. 6 shows a data processing system in the form of a server computing device configured to generate a delivery receipt, according to another embodiment of the present disclosure.

Although, in FIGS. 1-5, the receipt is a read receipt 44, in other embodiments, as shown in FIG. 6, the receipt may be a delivery receipt 144. FIG. 6 shows an embodiment in which the data processing system is a server computing device 100 configured to output a delivery receipt 144. In such embodiments, the delivery receipt 144 may indicate that the first user 72A has received each message 22 included in a merged message storage data structure 140. The processor 104 of the server computing device 100 shown in FIG. 6 may generate the delivery receipt 144 when a message 22 of the plurality of messages 22 is sent to the first user 72A. In the embodiment of FIG. 6, the server computing device 100 may include non-volatile memory 102 that stores metadata 124 including a plurality of message delivery timestamps 126. Each message delivery timestamp 126 may be associated with a respective message 22 included in the group discussion 20 and may indicate a time at which that message 22 was delivered to the first user 72A.

The delivery receipt 144 may include a merged data structure timestamp 142 indicating a time at which the one or more messages 22 included in the merged message storage data structure 140 were delivered to the first user 72A. In such embodiments, similarly to when the receipt is a read receipt 44, generating the merged data structure timestamp 142 may include determining that a first message storage data structure 132 and a second message storage data structure 136 respectively have a first data structure timestamp 134 and a second data structure timestamp 138 within a predetermined threshold time 46 of each other. Thus, the processor 104 may combine the first message storage data structure 132 and the second message storage data structure 136 when the one or more respective messages 22 included in each were delivered to the first user 72A in close temporal proximity.

Figure 7:
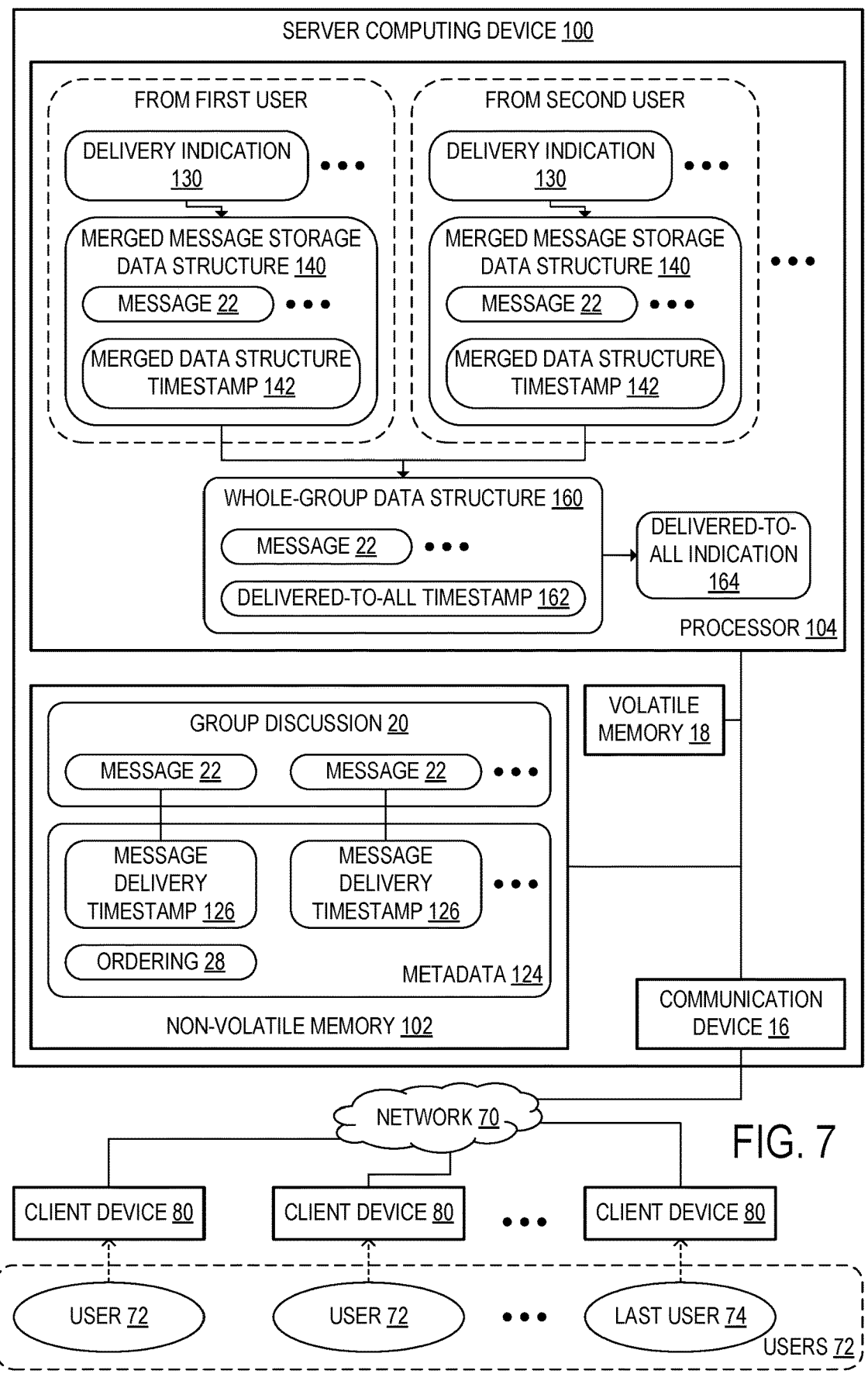
FIG. 7 shows the server computing device of FIG. 6 in an embodiment in which the processor is configured to generate a delivered-to-all indication.

In addition, as shown in FIG. 7, the processor 104 may be further configured to determine, for at least one message 22 of the plurality of messages 22, that the message 22 has been delivered to each user 72 of the plurality of users 72. In such embodiments, the processor 104 may be further configured to generate a delivered-to-all indication 164 that the message 22 has been delivered to each user 72. The processor 104 may generate a whole-group data structure 160 including each message 22 delivered to all the users 72. The processor 104 may generate the whole-group data structure 160 based on the respective merged message storage data structures 140 associated with the plurality of users 72. Generating the whole-group data structure 160 may include identifying one or more messages 22 included in each merged message storage data structure. The whole-group data structure 160 may further include a delivered-to-all timestamp 162 indicating a time at which the at least one message 22 was delivered to a last user 74 of the plurality of users 72. The processor 104 may be further configured to transmit the delivered-to-all indication 164 to each user 72 of the plurality of users 72. In some embodiments, the processor 104 may transmit the delivered-to-all indication 164 to each user 72 included in the group discussion 20.

Figure 8A:
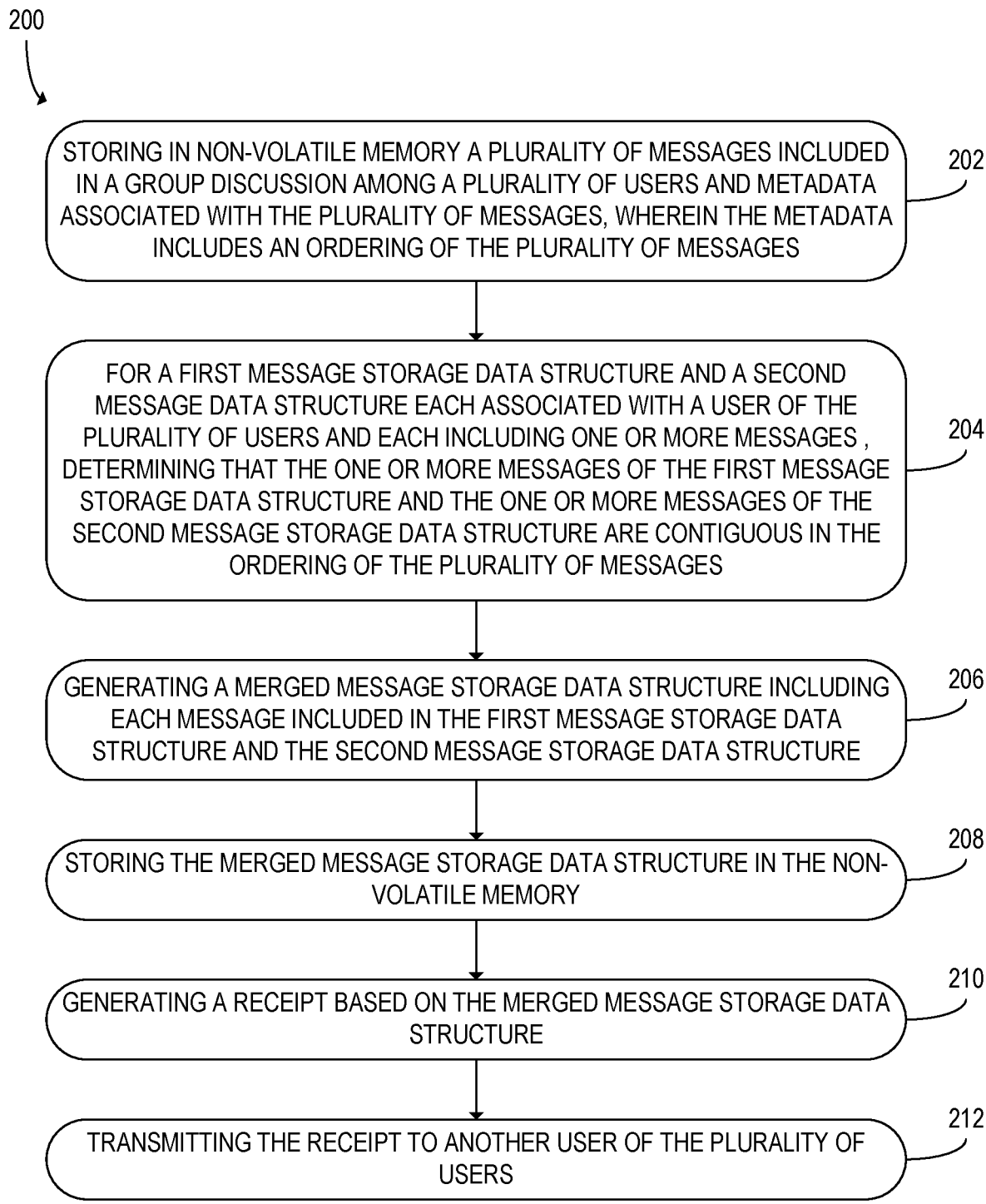
FIG. 8A shows a method that may be performed at a server computing device.

FIG. 8A shows a flowchart of an example method 200 method for use with a server computing device. The server computing device may be the server computing device 10 of FIG. 1, the server computing device 100 of FIG. 6, or some other server computing device. The method 200 may include, at step 202, storing in non-volatile memory a plurality of messages included in a group discussion among a plurality of users. Metadata associated with the plurality of messages may also be stored in the non-volatile memory. The metadata may include an ordering of the plurality of messages, which may be a temporal ordering.

The computing device on which the method 200 is performed may store a first message storage data structure and a second message storage data structure in non-volatile memory. The first message storage data structure and the second message storage data structure each may be associated with a first user included in the group discussion and each may include one or more messages. At step 204, the method 200 may further include, for the first message storage data structure and the second message storage data structure associated, determining that the one or more messages of the first message storage data structure and the one or more messages of the second message storage data structure are contiguous in the ordering of the plurality of messages. For example, the first message storage data structure and the second message storage data structure may be respectively associated with a first page of messages and a second page of messages viewed in temporal succession by the first user. The first message storage data structure and the second message storage data structure may respectively include a first data structure timestamp and a second data structure timestamp, which may each indicate a time at which the first user accessed or received one or more messages included in that data structure.

At step 206, the method 200 may further include generating a merged message storage data structure. The merged message storage data structure may include each message included in the first message storage data structure and the second message storage data structure. The merged message storage data structure may further include a merged data structure timestamp, as described in further detail below. At step 208, the method 200 may further include storing the merged message storage data structure in non-volatile memory.

At step 210, the method 200 may further include generating a receipt based on the merged message storage data structure. For example, the receipt may include data included in the merged message storage data structure, such as one or more messages and/or the merged data structure timestamp. In some embodiments, the receipt may be a read receipt indicating that the first user has accessed each message included in the merged message storage data structure. In other embodiments, the receipt may be a delivery receipt indicating that the user has received each message included in the merged message storage data structure. At step 212, the method 200 may further include transmitting the receipt to a second user of the plurality of users. Thus, the second user may be notified that the first user has accessed the messages included in the merged message storage data structure or that the messages included in the merged message storage data structure have been delivered to the first user. In some embodiments, the second user may be a user who sent at least one message included in the merged message storage data structure.

Figure 8B:
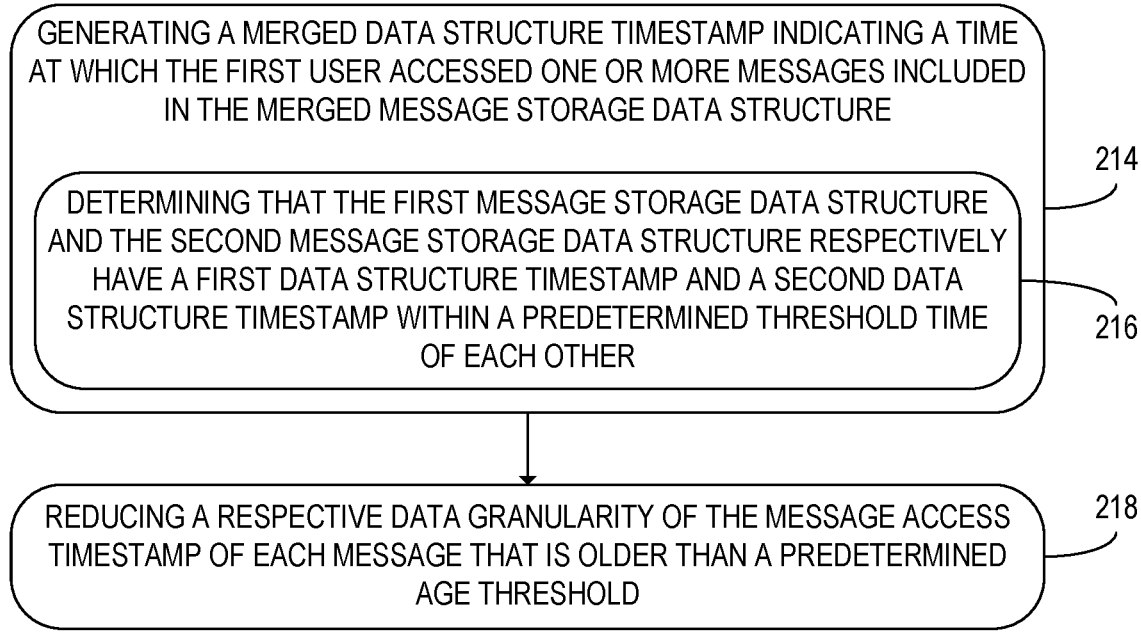
FIGS. 8B-E show additional steps of the method of FIG. 8A that may be performed in some embodiments.

FIG. 8B shows additional steps that may be performed in some embodiments when performing the method 200 of FIG. 8A. In the embodiment of FIG. 8B, the receipt is a read receipt, and the receipt further includes a merged data structure timestamp. The merged data structure timestamp may indicate a time at which the first user accessed one or more messages included in the merged message storage data structure. At step 214, the method 200 may further include generating the merged data structure timestamp. Step 214 may include, at step 216, determining that the first message storage data structure and the second message storage data structure respectively have a first data structure timestamp and a second data structure timestamp within a predetermined threshold time of each other. This determination may be made based on the ordering of the messages in the group discussion and/or the respective message timestamps associated with the messages included in the first message storage data structure and the second message storage data structure.

In embodiments in which a merged data structure timestamp is generated, the method 200 may further include, at step 218, reducing a respective data granularity of the message access timestamp of each message that is older than a predetermined age threshold. For example, the data granularity for a message access timestamp older than one week may be reduced by deleting data indicating an hour and a minute at which the message was accessed, leaving only data indicating a date.

Figure 8C:
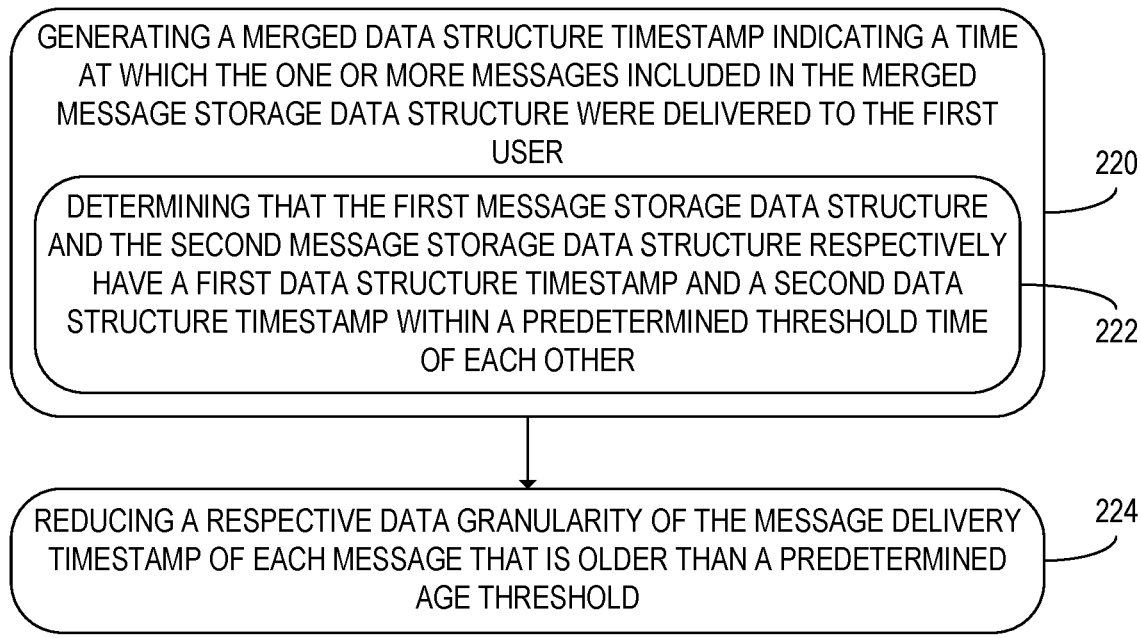

FIG. 8C shows additional steps of the method 200 that may be performed in embodiments in which the receipt is a delivery receipt. At step 220, the method 200 may include generating a merged data structure timestamp. The merged data structure timestamp may indicate a time at which the one or more messages included in the merged message storage data structure were delivered to the first user. In one example, time indicated by the merged data structure timestamp may be a time at which the last message in the merged message storage data structure, as determined from the ordering, was delivered to the first user. In some embodiments, step 220 may include, at step 222, determining that the first message storage data structure and the second message storage data structure respectively have a first data structure timestamp and a second data structure timestamp within a predetermined threshold time of each other.

In embodiments in which a merged data structure timestamp is generated, the method 200 may further include, at step 224, reducing a respective data granularity of the message delivery timestamp of each message that is older than a predetermined age threshold. The data granularity of the message delivery timestamp may be reduced by deleting data indicating a smallest time increment included in the timestamp, according to one example.

Figure 8D:
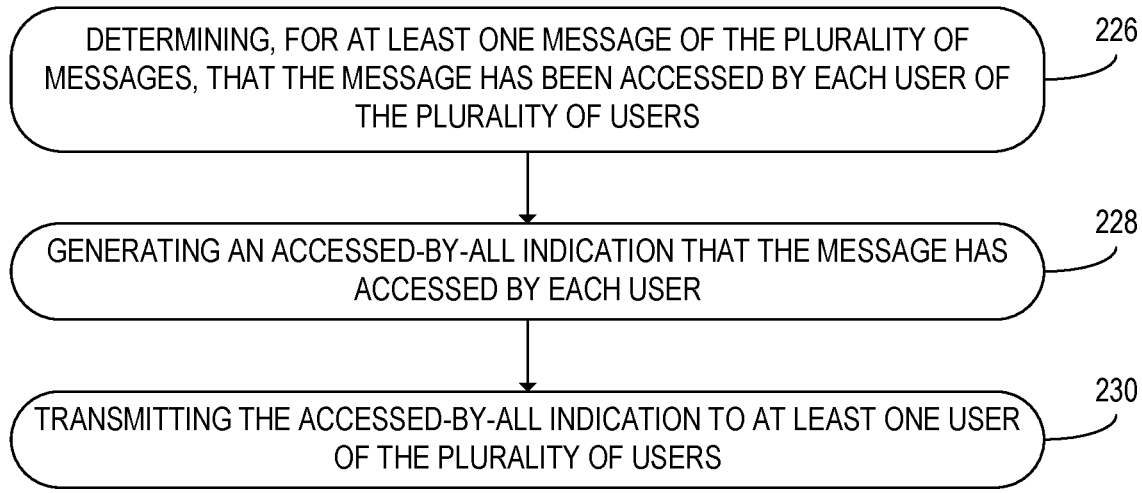

FIG. 8D shows additional steps of the method 200 that may be performed in some embodiments when the receipt is a read receipt. At step 226, the method 200 may further include determining, for at least one message of the plurality of messages, that the message has been accessed by each user of the plurality of users. For example, this determination may be made by determining an intersection of a plurality of merged message storage data structures respectively associated with the plurality of users included in the group discussion. At step 228, the method 200 may further include generating an accessed-by-all indication that the message has accessed by each user. The accessed-by-all indication may include an accessed-by-all timestamp indicating a time at which a last user of the plurality of users accessed the at least one message. At step 230, the method 200 may further include transmitting the accessed-by-all indication to at least one user of the plurality of users. In some embodiments, the accessed-by-all indication may be transmitted to each user included in the group discussion.

Figure 8E:
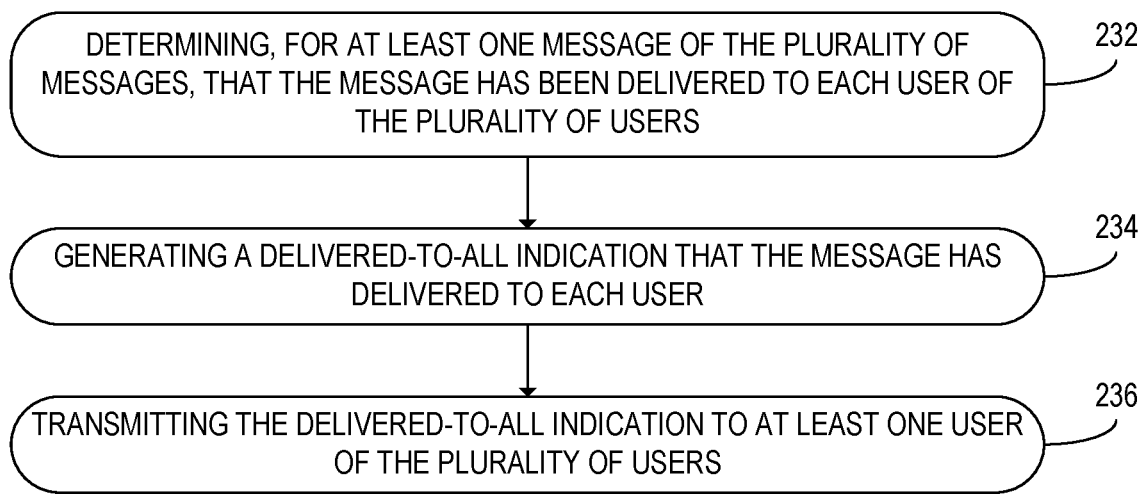

FIG. 8E shows additional steps of the method 200 that may be performed in some embodiments when the receipt is a delivery receipt. At step 232, the method 200 may further include determining, for at least one message of the plurality of messages, that the message has been delivered to each user of the plurality of users. For example, this determination may be made by determining an intersection of a plurality of merged message storage data structures respectively associated with the plurality of users included in the group discussion. At step 234, the method 200 may further include generating a delivered-to-all indication that the message has been delivered to each user. The method 200 may further include, at step 236, transmitting the delivered-to-all indication to at least one user of the plurality of users. In some embodiments, the delivered-to-all indication may be transmitted to each user included in the group discussion.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
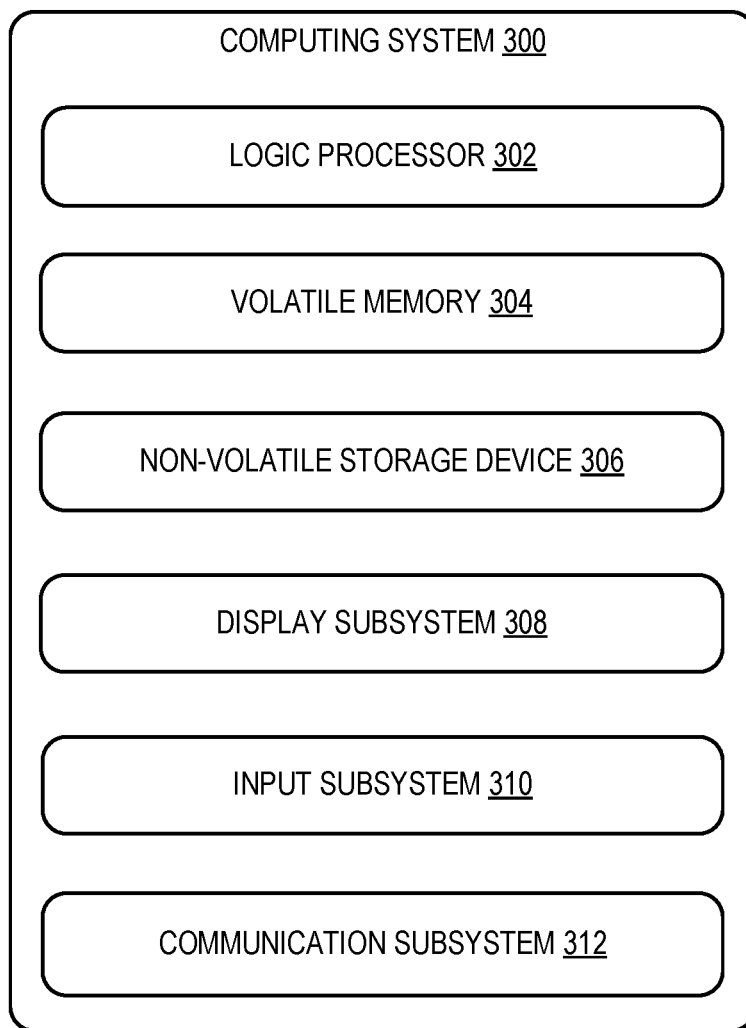
FIG. 9 shows a schematic view of an example computing environment in which the server computing device of FIG. 1 may be enacted.

FIG. 9 schematically shows a non-limiting embodiment of a computing system 300 that can enact one or more of the methods and processes described above. Computing system 300 is shown in simplified form. Computing system 300 may embody a data processing system such as the server computing device 10 described above and illustrated in FIG. 1 or the server computing device 100 described above and illustrated in FIG. 6. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 9.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FP GAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

According to one aspect of the present disclosure, a data processing system is provided, including non-volatile memory storing a plurality of messages included in a group discussion among a plurality of users and metadata associated with the plurality of messages. The metadata may include an ordering of the plurality of messages. The data processing system may further include a processor configured to, for a first message storage data structure and a second message storage data structure, each associated with a first user of the plurality of users and each including one or more messages from the group discussion, determine that the one or more messages of the first message storage data structure and the one or more messages of the second message storage data structure are contiguous in the ordering of the plurality of messages. The processor may be further configured to generate a merged message storage data structure including each message from the group discussion included in the first message storage data structure and the second message storage data structure. The processor may be further configured to generate a receipt based on the merged message storage data structure. The processor may be further configured to transmit the receipt to a second user of the plurality of users.

According to this aspect, the receipt may be a read receipt indicating that the first user has accessed each message included in the merged message storage data structure.

According to this aspect, the metadata may further include a respective message access timestamp for each message that indicates a time at which the first user accessed the message.

According to this aspect, the receipt may further include a merged data structure timestamp indicating a time at which the first user accessed one or more messages included in the merged message storage data structure. The processor may be configured to generate the merged data structure timestamp at least in part by determining that the first message storage data structure and the second message storage data structure respectively have a first data structure timestamp and a second data structure timestamp within a predetermined threshold time of each other.

According to this aspect, the processor may be further configured to generate the merged data structure timestamp at least in part by reducing a data granularity of the respective message access timestamps of each message included in the merged message storage data structure. After the merged data structure timestamp is generated, the processor may be further configured to delete the message access timestamp of each message included in the merged message storage data structure from the non-volatile memory.

According to this aspect, the processor may be further configured to reduce a respective data granularity of the message access timestamp of each message that is older than a predetermined age threshold.

According to this aspect, a first data structure timestamp may be associated with the first message storage data structure and a second data structure timestamp may be associated with the second message storage data structure. The first data structure timestamp and the second data structure timestamp may each have a compressed data granularity lower than a message data granularity of each message access timestamp.

According to this aspect, the processor may be further configured to determine, for at least one message of the plurality of messages, that the message has been accessed by each user of the plurality of users. The processor may be further configured to generate an accessed-by-all indication that the message has accessed by each user. The processor may be further configured to transmit the accessed-by-all indication to at least one user of the plurality of users.

According to this aspect, the accessed-by-all indication may include an accessed-by-all timestamp indicating a time at which a last user of the plurality of users accessed the at least one message.

According to this aspect, the receipt may be a delivery receipt indicating that the first user has received each message included in the merged message storage data structure.

According to this aspect, the processor may be further configured to store the merged message storage data structure in the non-volatile memory.

According to another aspect of the present disclosure, a method for use with a data processing system is provided. The method may include storing in non-volatile memory a plurality of messages included in a group discussion among a plurality of users and metadata associated with the plurality of messages. The metadata may include an ordering of the plurality of messages. The method may further include, for a first message storage data structure and a second message storage data structure, each associated with a first user of the plurality of users and each including one or more messages, determining that the one or more messages of the first message storage data structure and the one or more messages of the second message storage data structure are contiguous in the ordering of the plurality of messages. The method may further include generating a merged message storage data structure including each message included in the first message storage data structure and the second message storage data structure. The method may further include generating a receipt based on the merged message storage data structure. The method may further include transmitting the receipt to a second user of the plurality of users.

According to this aspect, the receipt may be a read receipt indicating that the first user has accessed each message included in the merged message storage data structure.

According to this aspect, the metadata may further include a respective message access timestamp for each message that indicates a time at which the first user accessed the message.

According to this aspect, the receipt may further include a merged data structure timestamp indicating a time at which the first user accessed one or more messages included in the merged message storage data structure. Generating the merged data structure timestamp may include determining that the first message storage data structure and the second message storage data structure respectively have a first data structure timestamp and a second data structure timestamp within a predetermined threshold time of each other.

According to this aspect, the method may further include reducing a respective data granularity of the message access timestamp of each message that is older than a predetermined age threshold.

According to this aspect, the method may further include determining, for at least one message of the plurality of messages, that the message has been accessed by each user of the plurality of users. The method may further include generating an accessed-by-all indication that the message has accessed by each user. The method may further include transmitting the accessed-by-all indication to at least one user of the plurality of users.

According to this aspect, the accessed-by-all indication may include an accessed-by-all timestamp indicating a time at which a last user of the plurality of users accessed the at least one message.

According to this aspect, the receipt may be a delivery receipt indicating that the user has received each message included in the merged message storage data structure.

According to another aspect of the present disclosure, a data processing system is provided, including non-volatile memory storing a merged message storage data structure. The merged message storage data structure may include a plurality of messages included in a group discussion among a plurality of users. The merged message storage data structure may further include metadata associated with the plurality of messages. The metadata may include an ordering of the plurality of messages. The merged message storage data structure may be generated by a processor of the computing device at least in part by combining a first message storage data structure that includes a first plurality of messages associated with a user of the plurality of users and a second message storage data structure that includes a second plurality of messages associated with the user and contiguous with the first plurality of messages in the ordering.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A data processing system comprising:
   non-volatile memory storing:
      a plurality of messages included in a group discussion among a plurality of users; and
      metadata associated with the plurality of messages, wherein the metadata includes an ordering of the plurality of messages; and
   a processor configured to:
      for a first message storage data structure and a second message storage data structure, each associated with a first user of the plurality of users and each including one or more messages from the group discussion, determine that the one or more messages of the first message storage data structure and the one or more messages of the second message storage data structure are contiguous in the ordering of the plurality of messages;
      in response to the determination that the one or more messages of the first message storage data structure and the one or more messages of the second message storage data structure are contiguous in the ordering, generate a merged message storage data structure including each message from the group discussion included in the first message storage data structure and the second message storage data structure;
      generate a receipt based on the merged message storage data structure, wherein the receipt is a read receipt indicating that the first user has accessed each message included in the merged message storage data structure or a delivery receipt indicating that the first user has received each message included in the merged message storage data structure; and
      transmit the receipt to a second user of the plurality of users.

2. The data processing system of claim 1, wherein the receipt is the read receipt indicating that the first user has accessed each message included in the merged message storage data structure.

3. The data processing system of claim 2, wherein the metadata further includes a respective message access timestamp for each message that indicates a time at which the first user accessed the message.

4. The data processing system of claim 3, wherein:
   the receipt further includes a merged data structure timestamp indicating a time at which the first user accessed one or more messages included in the merged message storage data structure; and
   the processor is configured to generate the merged data structure timestamp at least in part by determining that the first message storage data structure and the second message storage data structure respectively have a first data structure timestamp and a second data structure timestamp within a predetermined threshold time of each other.

5. The data processing system of claim 4, wherein the processor is further configured to:
   generate the merged data structure timestamp at least in part by reducing a data granularity of the respective message access timestamps of each message included in the merged message storage data structure; and
   after the merged data structure timestamp is generated, delete the message access timestamp of each message included in the merged message storage data structure from the non-volatile memory.

6. The data processing system of claim 3, wherein the processor is further configured to reduce a respective data granularity of the message access timestamp of each message that is older than a predetermined age threshold.

7. The data processing system of claim 3, wherein:
a first data structure timestamp is associated with the first message storage data structure;
a second data structure timestamp is associated with the second message storage data structure; and
the first data structure timestamp and the second data structure timestamp each have a compressed data granularity lower than a message data granularity of each message access timestamp.

8. The data processing system of claim 2, wherein the processor is further configured to:
determine, for at least one message of the plurality of messages, that the message has been accessed by each user of the plurality of users;
generate an accessed-by-all indication that the message has accessed by each user; and
transmit the accessed-by-all indication to at least one user of the plurality of users.

9. The data processing system of claim 8, wherein the accessed-by-all indication includes an accessed-by-all timestamp indicating a time at which a last user of the plurality of users accessed the at least one message.

10. The data processing system of claim 1, wherein the receipt is the delivery receipt indicating that the first user has received each message included in the merged message storage data structure.

11. The data processing system of claim 1, wherein the processor is further configured to store the merged message storage data structure in the non-volatile memory.

12. A method for use with a data processing system, the method comprising:
storing in non-volatile memory:
a plurality of messages included in a group discussion among a plurality of users; and
metadata associated with the plurality of messages, wherein the metadata includes an ordering of the plurality of messages;
for a first message storage data structure and a second message storage data structure, each associated with a first user of the plurality of users and each including one or more messages, determining that the one or more messages of the first message storage data structure and the one or more messages of the second message storage data structure are contiguous in the ordering of the plurality of messages;
in response to the determination that the one or more messages of the first message storage data structure and the one or more messages of the second message storage data structure are contiguous in the ordering, generating a merged message storage data structure including each message included in the first message storage data structure and the second message storage data structure;
generating a receipt based on the merged message storage data structure, wherein the receipt is a read receipt indicating that the first user has accessed each message included in the merged message storage data structure or a delivery receipt indicating that the first user has received each message included in the merged message storage data structure; and
transmitting the receipt to a second user of the plurality of users.

13. The method of claim 12, wherein the receipt is the read receipt indicating that the first user has accessed each message included in the merged message storage data structure.

14. The method of claim 13, wherein the metadata further includes a respective message access timestamp for each message that indicates a time at which the first user accessed the message.

15. The method of claim 14, wherein:
the receipt further includes a merged data structure timestamp indicating a time at which the first user accessed one or more messages included in the merged message storage data structure; and
generating the merged data structure timestamp includes determining that the first message storage data structure and the second message storage data structure respectively have a first data structure timestamp and a second data structure timestamp within a predetermined threshold time of each other.

16. The method of claim 14, further comprising reducing a respective data granularity of the message access timestamp of each message that is older than a predetermined age threshold.

17. The method of claim 13, further comprising:
determining, for at least one message of the plurality of messages, that the message has been accessed by each user of the plurality of users;
generating an accessed-by-all indication that the message has accessed by each user; and
transmitting the accessed-by-all indication to at least one user of the plurality of users.

18. The method of claim 17, wherein the accessed-by-all indication includes an accessed-by-all timestamp indicating a time at which a last user of the plurality of users accessed the at least one message.

19. The method of claim 12, wherein the receipt is the delivery receipt indicating that the user has received each message included in the merged message storage data structure.

20. A data processing system comprising:
non-volatile memory storing a merged message storage data structure, wherein:
the merged message storage data structure includes:
a plurality of messages included in a group discussion among a plurality of users; and
metadata associated with the plurality of messages, wherein the metadata includes an ordering of the plurality of messages; and
the merged message storage data structure is generated by a processor of the computing device at least in part by combining:
a first message storage data structure that includes a first plurality of messages associated with a user of the plurality of users; and
a second message storage data structure that includes a second plurality of messages associated with the user and contiguous with the first plurality of messages in the ordering, wherein:
the merged message storage data structure is generated in response to a determination that the first plurality of messages of the first message storage data structure and the second plurality of messages of the second message storage data structure are contiguous in the ordering, and
the receipt is a read receipt indicating that the user has accessed each message included in the merged message storage data structure or a delivery receipt indicating that the user has received each message included in the merged message storage data structure.

* * * * *